US012713141B2

(12) United States Patent
Chuang et al.

(10) Patent No.: US 12,713,141 B2
(45) Date of Patent: Aug. 18, 2026

(54) SYSTEM AND METHOD FOR ACHIEVING FLICKER REMOVAL WITHOUT USING FLICKER-INDEPENDENT FRAME

(71) Applicant: MEDIATEK INC., Hsinchu City (TW)

(72) Inventors: Chia-Yun Chuang, Hsinchu City (TW); Shih-Wei Hu, Hsinchu City (TW); Chieh-Kai Kao, Hsinchu City (TW); Gang-Wei Fan, Hsinchu City (TW); Shao-Hsiang Chang, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 38 days.

(21) Appl. No.: 19/032,127

(22) Filed: Jan. 20, 2025

(65) Prior Publication Data

US 2025/0247628 A1 Jul. 31, 2025

Related U.S. Application Data

(60) Provisional application No. 63/626,077, filed on Jan. 29, 2024.

(51) Int. Cl.

| | |
|---|---|
| ***H04N 23/745*** | (2023.01) |
| ***H04N 23/72*** | (2023.01) |
| ***H04N 23/73*** | (2023.01) |
| ***H04N 23/741*** | (2023.01) |
| ***H04N 23/76*** | (2023.01) |

(52) U.S. Cl.
CPC ........... *H04N 23/745* (2023.01); *H04N 23/72* (2023.01); *H04N 23/73* (2023.01); *H04N 23/741* (2023.01); *H04N 23/76* (2023.01)

(58) Field of Classification Search
CPC .... H04N 23/745; H04N 23/72; H04N 23/741; H04N 23/76; H04N 23/73
USPC ........................................................ 348/226.1
See application file for complete search history.

(56) References Cited

U.S. PATENT DOCUMENTS

| | | | | |
|---|---|---|---|---|
| 7,289,144 | B2 * | 10/2007 | Arazaki | H04N 23/70 348/E5.034 |
| 8,878,957 | B2 * | 11/2014 | Zhang | H04N 23/88 348/226.1 |
| 9,055,228 | B2 * | 6/2015 | Kinoshita | H04N 25/68 |
| 9,407,832 | B2 * | 8/2016 | Peng | H04N 25/589 |
| 9,686,505 | B2 * | 6/2017 | Liu | H04N 5/21 |
| 10,237,492 | B2 * | 3/2019 | Noh | H04N 23/745 |
| 11,082,628 | B2 * | 8/2021 | Tasdizen | H04N 7/0132 |
| 11,128,799 | B2 * | 9/2021 | Kobayashi | H04N 23/73 |
| 12,231,780 | B2 * | 2/2025 | Le | G06V 10/772 |
| 2013/0278792 | A1 * | 10/2013 | Zhang | H04N 23/88 382/167 |
| 2015/0036737 | A1 * | 2/2015 | Puri | H04N 19/573 375/240.02 |

(Continued)

*Primary Examiner* — Pritham D Prabhakher
(74) *Attorney, Agent, or Firm* — Winston Hsu

(57) ABSTRACT

A de-flicker system includes a compensation gain estimation circuit and a flicker removal circuit. The compensation gain estimation circuit receives a plurality of flicker-dependent frames with sliding bandings, and estimates a compensation gain for each of the plurality of flicker-dependent frames according to the flicker-dependent frames. The flicker removal circuit applies flicker compensation to each of the flicker-dependent frames according to the compensation gain.

18 Claims, 6 Drawing Sheets

(56) References Cited

U.S. PATENT DOCUMENTS

| | | | | |
|---|---|---|---|---|
| 2015/0195487 | A1* | 7/2015 | Liu | H04N 7/0132<br>348/447 |
| 2015/0312464 | A1* | 10/2015 | Peng | H04N 25/531<br>348/226.1 |
| 2017/0295310 | A1* | 10/2017 | Yamashita | H04N 25/78 |
| 2019/0166298 | A1* | 5/2019 | Tasdizen | H04N 23/745 |
| 2020/0221028 | A1* | 7/2020 | Kobayashi | H04N 23/745 |

* cited by examiner

SYSTEM AND METHOD FOR ACHIEVING FLICKER REMOVAL WITHOUT USING FLICKER-INDEPENDENT FRAME

CROSS REFERENCE TO RELATED APPLICATIONS

This application claims the benefit of U.S. Provisional Application No. 63/626,077, filed on Jan. 29, 2024. The content of the application is incorporated herein by reference.

BACKGROUND

The present invention relates to post-processing of frames provided from an image source, and more particularly, to a de-flicker system of using flicker-dependent frames with sliding bands for compensation gain estimation and an associated method.

The rolling shutter is commonly used in a complementary metal-oxide-semiconductor (CMOS) image sensor. Unlike a global shutter camera that captures all pixels of one frame simultaneously, a rolling shutter camera captures pixels of one frame in a row-by-row fashion. However, this can cause problems under alternating current (AC) light sources powered by AC voltage signals, where the time lag between the exposure of individual lines (pixel rows) can result in noticeable bright and dark bands, known as flicker, if the shutter time is not synchronized with the light source frequency (e.g., the shutter time is not on the flicker base, which is the light source minimum period). One typical solution is to make the shutter time not shorter than the flicker base, causing a reduced dynamic range in a scene with bright illumination, artifacts in a fast-moving object, and overexposure in bright spots. Thus, there is a need for an innovative de-flicker framework which can remove/mitigate the flicker without using any reference frame (e.g., a flicker-independent frame that is flicker-free due to being captured under a condition that the shutter time of the rolling shutter is an integer multiple of the flicker base).

SUMMARY

One of the objectives of the claimed invention is to provide a de-flicker system of using flicker-dependent frames with sliding bands for compensation gain estimation and an associated method.

According to a first aspect of the present invention, an exemplary de-flicker system is disclosed. The exemplary de-flicker system includes a compensation gain estimation circuit and a flicker removal circuit. The compensation gain estimation circuit is configured to receive a plurality of flicker-dependent frames with sliding bandings, and estimate a compensation gain for each of the plurality of flicker-dependent frames according to the plurality of flicker-dependent frames. The flicker removal circuit is configured to apply flicker compensation to said each of the plurality of flicker-dependent frames according to the compensation gain.

According to a second aspect of the present invention, an exemplary de-flicker method is disclosed. The exemplary de-flicker method includes: receiving a plurality of flicker-dependent frames with sliding bandings; estimating a compensation gain for each of the plurality of flicker-dependent frames according to the plurality of flicker-dependent frames; and applying flicker compensation to said each of the plurality of flicker-dependent frames according to the compensation gain.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms “include” and “comprise” are used in an open-ended fashion, and thus should be interpreted to mean “include, but not limited to . . . ”. Also, the term “couple” is intended to mean either an indirect or direct electrical connection. Accordingly, if one device is coupled to another device, that connection may be through a direct electrical connection, or through an indirect electrical connection via other devices and connections.

Figure 1:
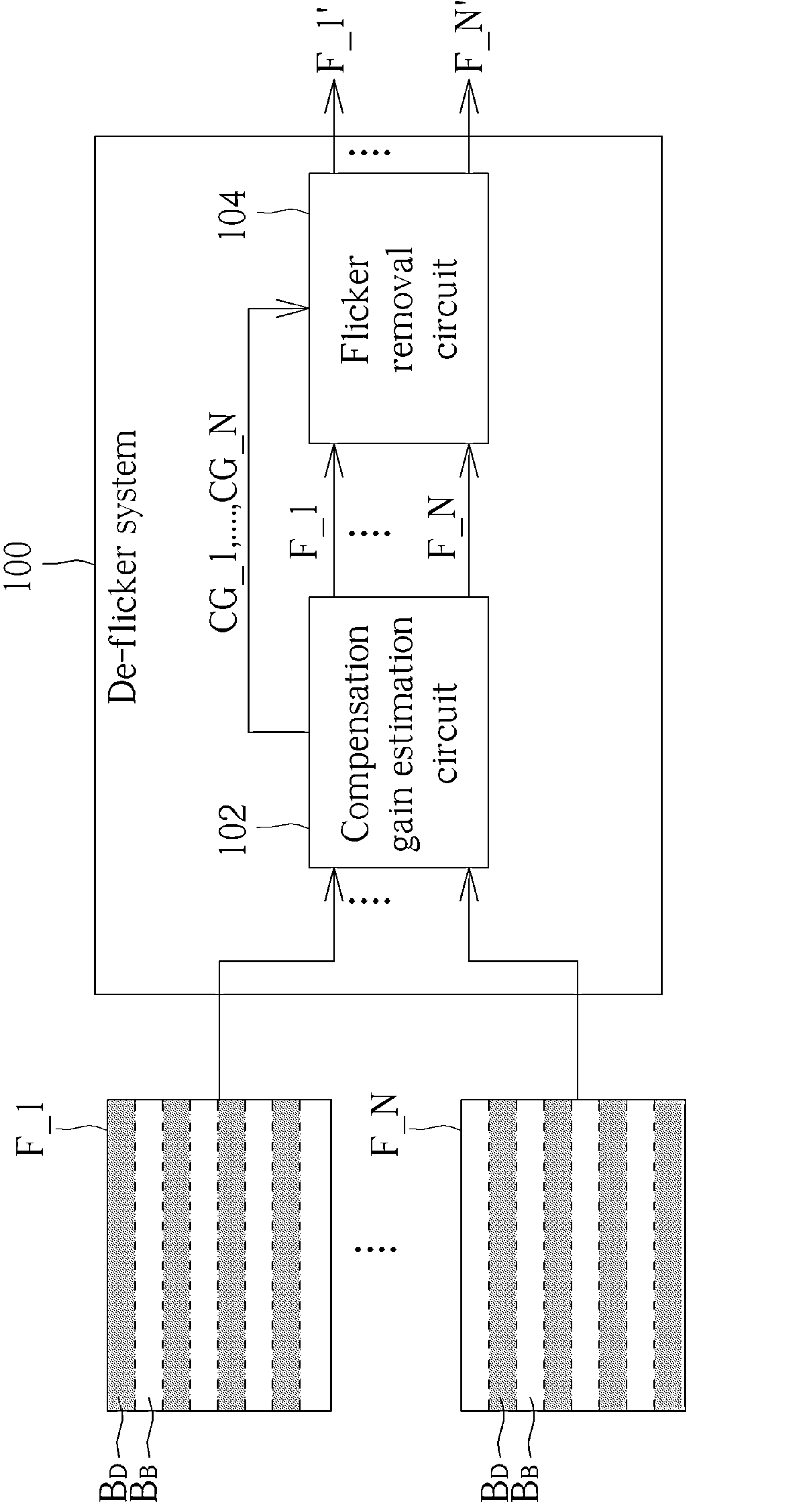
FIG. 1 is a diagram illustrating a de-flicker system according to an embodiment of the present invention.

FIG. 1 is a diagram illustrating a de-flicker system according to an embodiment of the present invention. By way of example, but not limitation, the de-flicker system 100 may be employed by a mobile device such as a mobile phone. The de-flicker system 100 includes a compensation gain estimation circuit 102 and a flicker removal circuit 104. The compensation gain estimation circuit 102 and the flicker removal circuit 104 may be implemented in a same chip or different chips, depending upon actual design considerations. The compensation gain estimation circuit 102 is configured to receive a plurality of flicker-dependent frames (i.e., captured frames that are not flicker-free) F_1-F_N ($N \geq 2$) with sliding bandings, and estimate compensation gains CG_1-CG_N for the flicker-dependent frames F_1-F_N according to the flicker-dependent frames F_1-F_N. For example, the flicker-dependent frames (i.e., frames that are not flicker-free) F_1-F_N are captured by a rolling shutter camera under a condition that scenes to be captured are illuminated by one or more AC light sources (which are flicker sources that may cause periodic flicker artifacts in captured frames). As shown in FIG. 1, the flicker-dependent frame F_1 includes a plurality of dark bandings $B_D$ and a plurality of bright bandings $B_B$ that are interleaved, where each banding may include one or more pixel rows. Similarly, the flicker-dependent frame F_N includes a plurality of dark bandings $B_D$ and a plurality of bright bandings $B_B$ that are interleaved, where each banding may include one or more pixel rows. The frames F_1-F_N are not limited to static environments. It should be noted that locations of dark bandings $B_D$ in the flicker-dependent frame F_N are not the same as that of dark bandings $B_D$ in the flicker-dependent frame F_1, and locations of bright bandings $B_B$ in the flicker-dependent frame F_N are not the same as that of bright bandings $B_B$ in the flicker-dependent frame F_1. Thus, the dark bandings $B_D$ slide in the flicker-dependent frame F_N (which may be captured at a later time instance) compared to the dark bandings $B_D$ in the flicker-dependent frame F_1 (which may be captured at an earlier time instance), and the bright bandings $B_B$ slide in the flicker-dependent frame F_N (which may be captured at a later time instance) compared to the bright bandings $B_B$ in the flicker-dependent frame F_1 (which may be captured at an earlier time instance). The compensation gain estimation circuit 102 can obtain compensation gains CG_1-CG_N by leveraging characteristics of sliding bandings possessed by two or more flicker-dependent frames F_1-F_N. The flicker removal circuit 104 is configured to apply flicker compensation to the flicker-dependent frames F_1-F_N according to the compensation gains CG_1-CG_N, respectively, and output flicker-compensated frames F_1'-F_N'. Specifically, the compensation gain CG_1 is used for eliminating/reducing flicker (i.e., alternation of bright banding and dark banding) of the flicker-dependent frame F_1 that is caused by an AC light source, and the compensation gain CG_N is used for eliminating/reducing flicker (i.e., alternation of bright banding and dark banding) of the flicker-dependent frame F_N that is caused by an AC light source.

In some embodiments of the present invention, the de-flicker system 100 and a camera module may be co-located on the same mobile device (e.g., mobile phone), and the de-flicker system 100 may obtain the flicker-dependent frames F_1-F_N needed for compensation gain estimation from the camera module.

Figure 2:
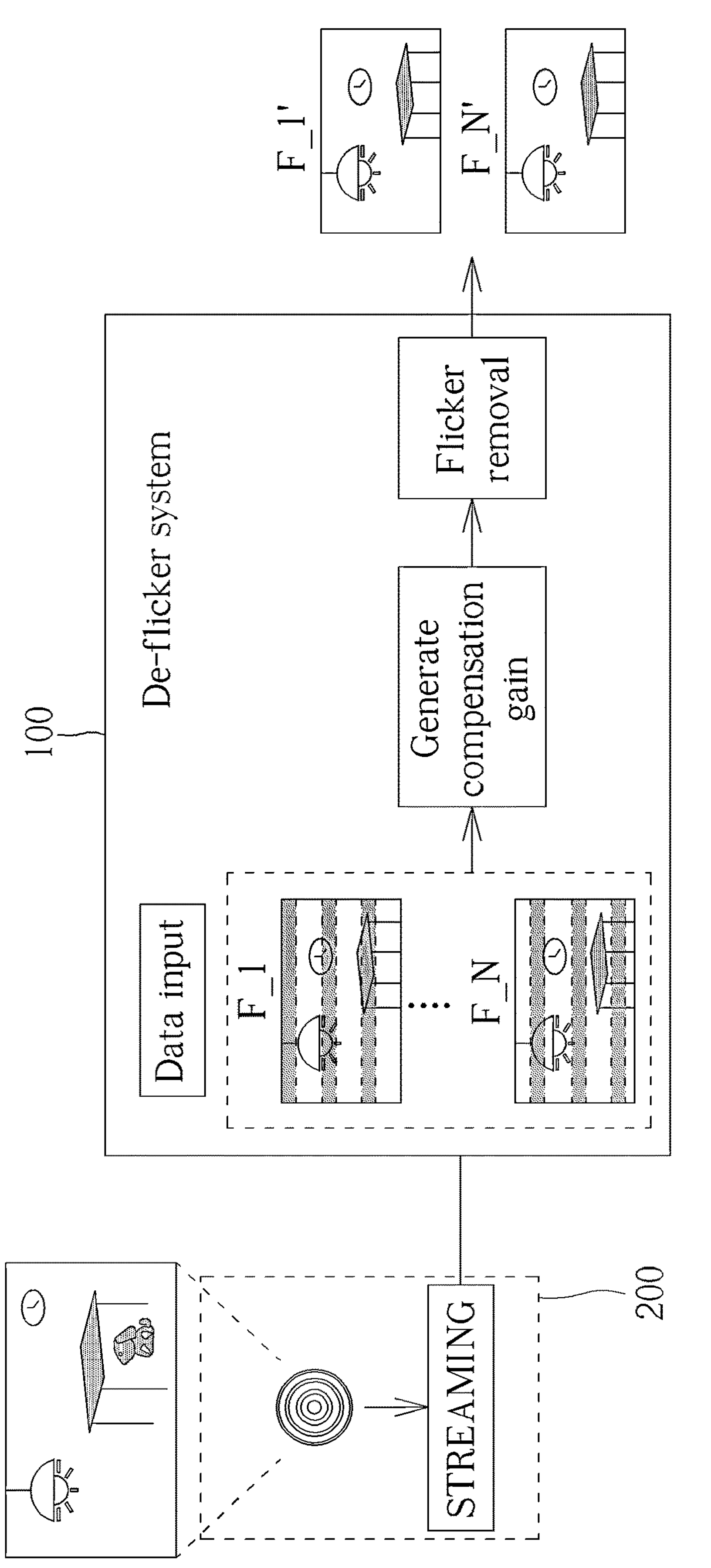
FIG. 2 is a diagram illustrating a de-flicker process applied to flicker-dependent frames obtained under a first camera mode according to an embodiment of the present invention.

FIG. 2 is a diagram illustrating a de-flicker process applied to flicker-dependent frames obtained under a first camera mode according to an embodiment of the present invention. In this embodiment, the compensation gain estimation circuit 102 receives flicker-dependent frames F_1-F_N (N≥2) from a camera module 200 operating under a regular single-exposure mode. It should be noted that the shutter time is not required to be on the flicker base. For example, the shutter time is not an integer multiple of the flicker base, and is allowed to be shorter than the flicker base.

Figure 3:
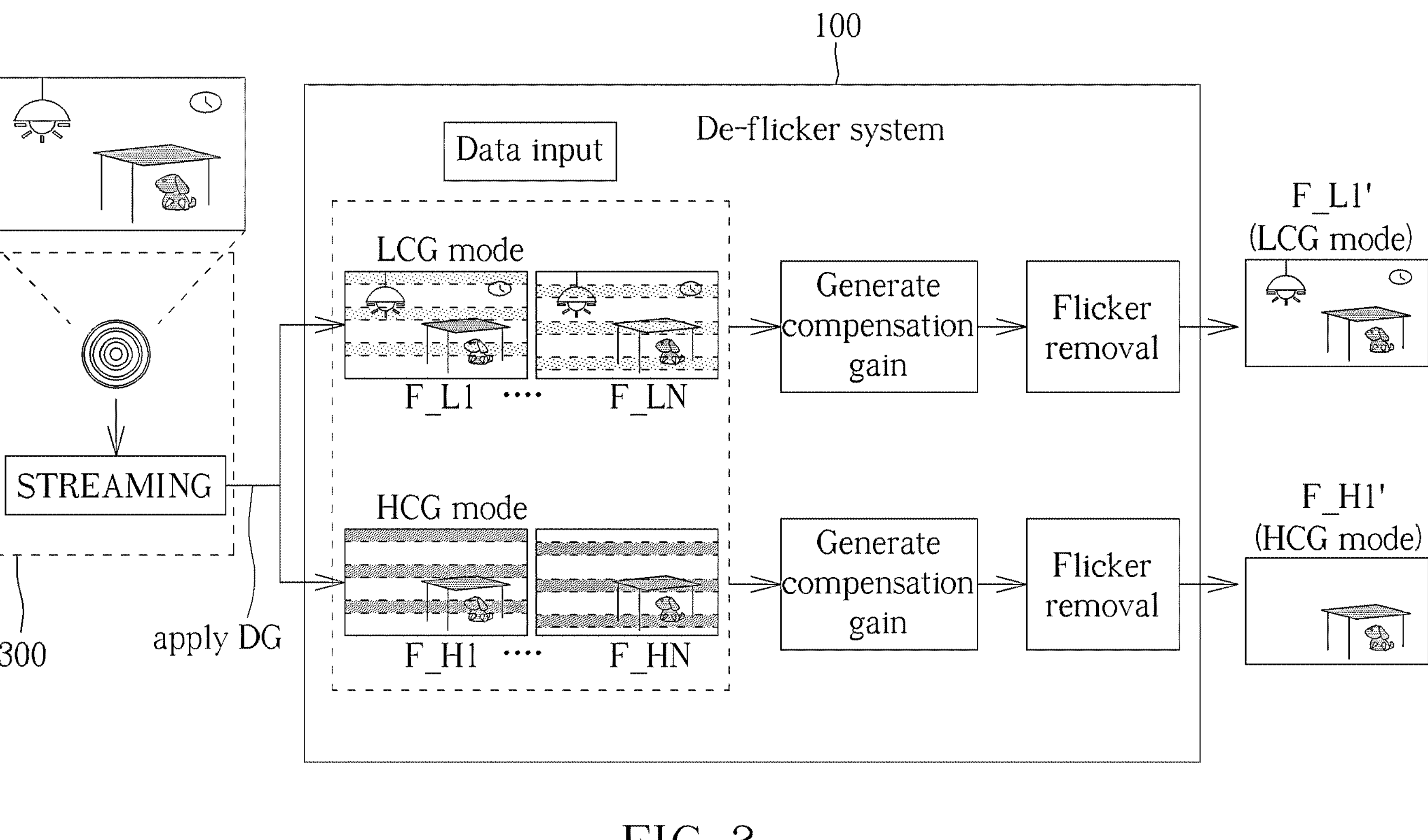
FIG. 3 is a diagram illustrating a de-flicker process applied to flicker-dependent frames obtained under a second camera mode according to an embodiment of the present invention.

FIG. 3 is a diagram illustrating a de-flicker process applied to flicker-dependent frames obtained under a second camera mode according to an embodiment of the present invention. In this embodiment, the compensation gain estimation circuit 102 receives flicker-dependent frames F_1-F_N (N≥2) from a camera module 300 operating under a dual-gain high dynamic range (DG-HDR) mode. Hence, different gains (e.g., analog gains or digital gains) are applied for generating two frames from one-shot image capture. For example, the DG-HDR mode may be a dual conversion gain (DCG) mode with a high conversion gain (HCG) and a low conversion gain (LCG), HCG is used to increase the conversion gain of the signal, used in low light conditions to improve the signal-to-noise ratio, and LCG is used to reduce the conversion gain of the signal, used in high light conditions to avoid signal saturation. Hence, one sequence of flicker-dependent frames F_1-F_N is generated under the LCG mode (marked as F_L1-F_LN in FIG. 3), and another sequence of flicker-dependent frames F_1-F_N is generated under the HCG mode (marked as F_H1-F_HN in FIG. 3), where the flicker-dependent frame F_Li (LCG mode) and the flicker-dependent frame F_Hi (HCG mode) are two frames generated from a single captured frame with different conversion gains applied thereto, where i={1, 2, . . . , N}. For another example, the DG-HDR mode may be a dual analog gain (DAG) mode with a high analog gain and a low analog gain, high analog gain is used to amplify the sensor output signal, used in low light conditions to increase signal strength, and low analog gain is used to reduce the amplification of the sensor output signal, used in high light conditions to avoid signal saturation. Hence, a sequence of flicker-dependent frames F_L1-F_LN is generated under one low analog gain mode, sequence of flicker-dependent frames F_H1-F_HN is generated under another high analog gain mode, where the flicker-dependent frame F_Li (one analog gain mode) and the flicker-dependent frame F_Hi (another analog gain mode) are two frames generated from a single captured frame with different analog gains applied thereto, where i={1, 2, . . . , N}. It should be noted that the shutter time is not required to be on the flicker base. For example, the shutter time is not an integer multiple of the flicker base, and is allowed to be shorter than the flicker base. In this embodiment, high and low gains are determined according to the photosensitive element, camera design, shooting scene, lighting conditions, image quality, etc. In this embodiment, different analog gain modes (high analog gain and low analog gain) and different conversion gain modes (high conversion gain and low conversion gain) that are used to generate flicker-dependent frames, and the shutter time is not required to be on the flicker base. This design has the following advantages: improving the dynamic range, by applying different conversion gains and analog gains in the same frame acquisition process, more brightness information can be obtained, using high conversion gain and high analog gain under low light conditions, more details can be obtained and noise can be reduced; using low conversion gain and low analog gain under high light conditions can avoid signal saturation and retain more brightness details. This dual gain mode (DCG and DAG) or using only one of them can effectively expand the dynamic range of the image, so that the details of dark and bright parts can be captured simultaneously in high-contrast scenes. The shutter time is not required to be on the flicker base, which means that the shutter time can be flexibly adjusted according to specific shooting needs: a short shutter time can capture fast-moving objects to reduce motion blur, and a long shutter time can increase the exposure time to capture more light in low-light conditions. By using different high and low conversion gains and/or analog gains to generate flicker-dependent frames, and flexibly setting the shutter time, the dynamic range of the image can be significantly improved, the flicker effect can be reduced, the image quality can be improved, and a variety of shooting scenes and conditions can be adapted. This design enables the camera to achieve better imaging effects under various complex lighting and motion conditions.

The compensation gain estimation circuit 102 can obtain the compensation gains CG_L1-CG_LN and CG_H1-

CG_HN by utilizing the sliding banding characteristics of two or more flicker-dependent frames F_L1-F_LN and F_H1-F_HN. The compensation gains CG_L1-CG_LN and CG_H1-CG_HN can be the same gain or different gains. The flicker elimination circuit 104 is used to perform flicker compensation on the flicker-dependent frames F_L1-F_LN and F_H1-F_HN according to the compensation gains CG_L1-CG_LN and CG_H1-CG_HN, respectively, and output the corresponding flicker-compensated frames F_Li' and F_Hi' (i=1, . . . , N) after flicker compensation, respectively. The embodiment shown in FIG. 3 takes the input of F_L1-F_LN and F_H1-F_HN to generate the corresponding flicker-compensated frames F_L1' and F_H1' after flicker compensation as an example. A person skilled in the art will appreciate that the embodiment of FIG. 3 may also use input F_L1-F_LN and F_H1-F_HN to generate the corresponding flicker-compensated frames F_L2' and F_H2', or F_L2' and F_H2' . . . or F_LN' and F_HN', after flicker compensation.

Figure 4:
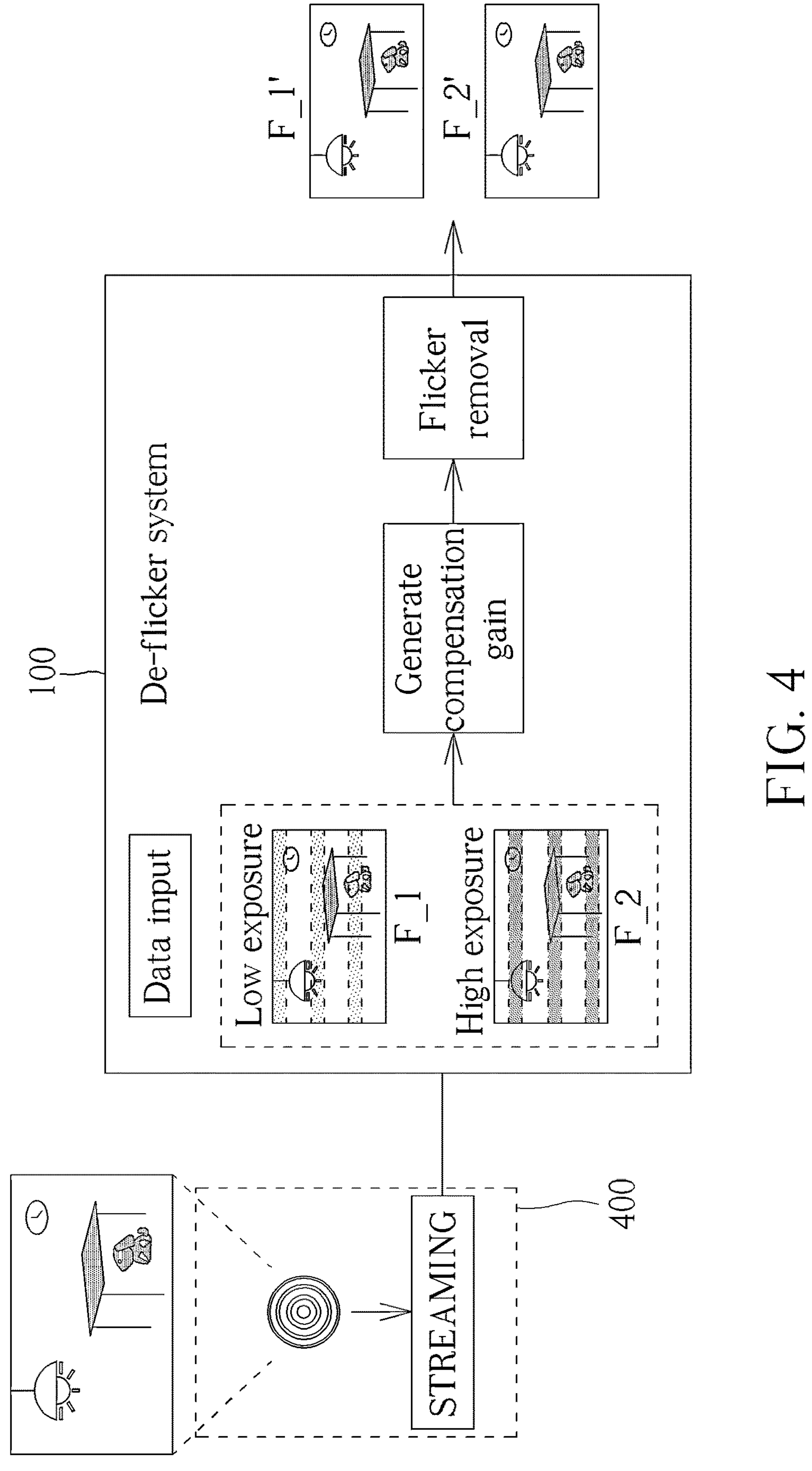
FIG. 4 is a diagram illustrating a de-flicker process applied to flicker-dependent frames obtained under a third camera mode according to an embodiment of the present invention.

FIG. 4 is a diagram illustrating a de-flicker process applied to flicker-dependent frames obtained under a third camera mode according to an embodiment of the present invention. In this embodiment, the compensation gain estimation circuit 102 receives flicker-dependent frames F_1 and F_N (N=2) from a camera module 400 operating under any other HDR mode with no flicker-independent frame (i.e., flicker-free frame). For example, the flicker-dependent frames F_1 and F_N (N=2) may be sequentially captured by the camera module 400 under different exposure settings, where the shutter time may be shorter than the flicker base.

The compensation gain estimation circuit 102 is used to estimate compensation gains CG_1-CG_N for flicker-dependent frames F_1-F_N, respectively. In a first compensation gain estimation design, the compensation gain estimation circuit 102 may utilize a mathematical model (e.g., a periodic function)) to model each compensation gain, and estimate parameters of the mathematical model according to the flicker-dependent frames F_1-F_N with sliding bandings. Each of the compensation gains CG_1-CG_N depends on a flicker signal that affects a corresponding flicker-dependent frame. The flicker signal may be modeled by a sinusoidal waveform or a non-sinusoidal waveform (e.g., a triangular wave or a square wave), depending upon design considerations. For better comprehension of technical features of the present invention, the following assumes that a flicker signal is modeled by a sinusoidal waveform $A\cdot\sin(\theta)$, and two flicker-dependent frames F_1 and F_N (N=2) are jointly used by the compensation gain estimation circuit 102 for compensation gain estimation.

Figure 5:
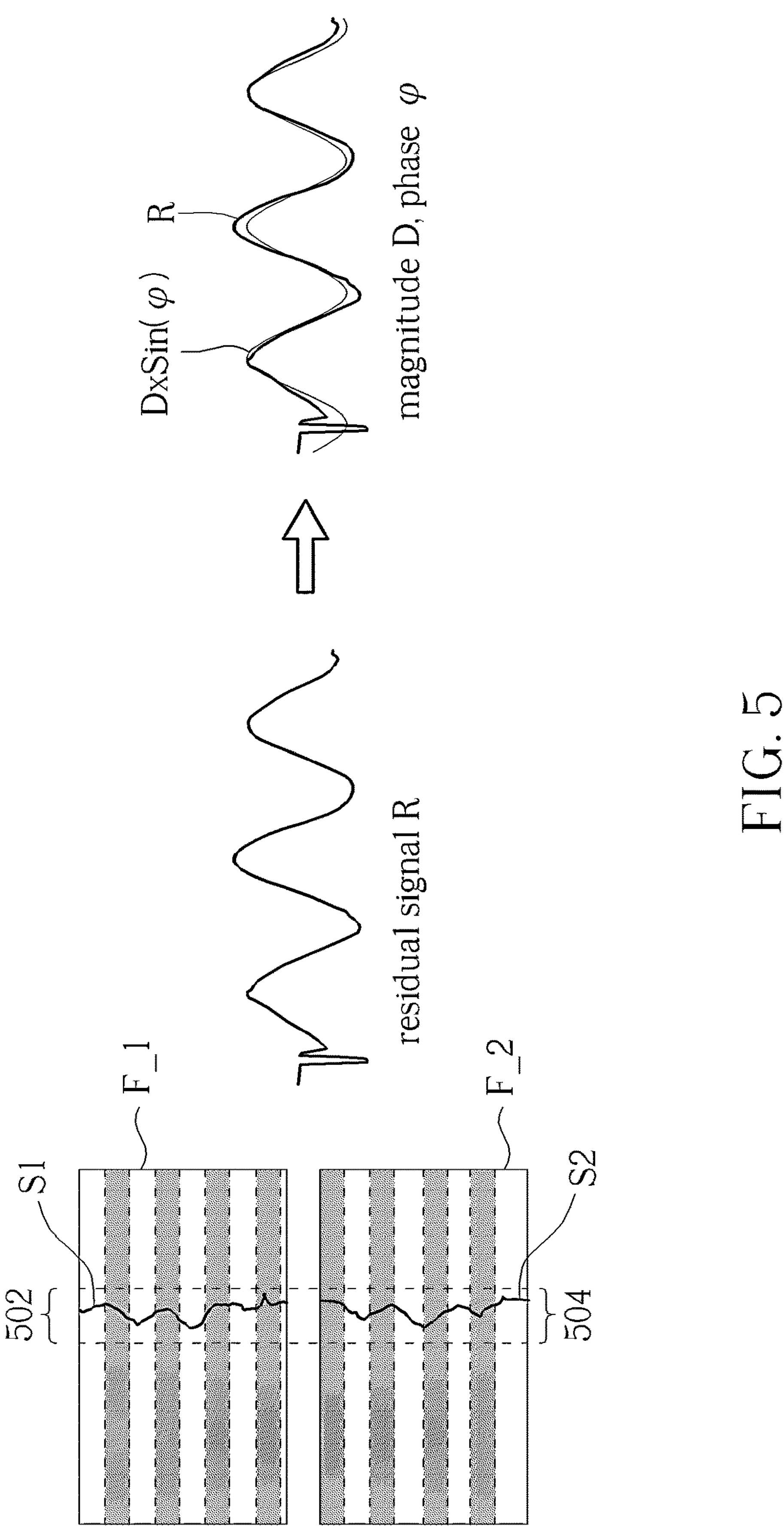
FIG. 5 is a diagram illustrating estimation of a sinusoidal waveform that best fits a residual signal according to an embodiment of the present invention.
Figure 6:
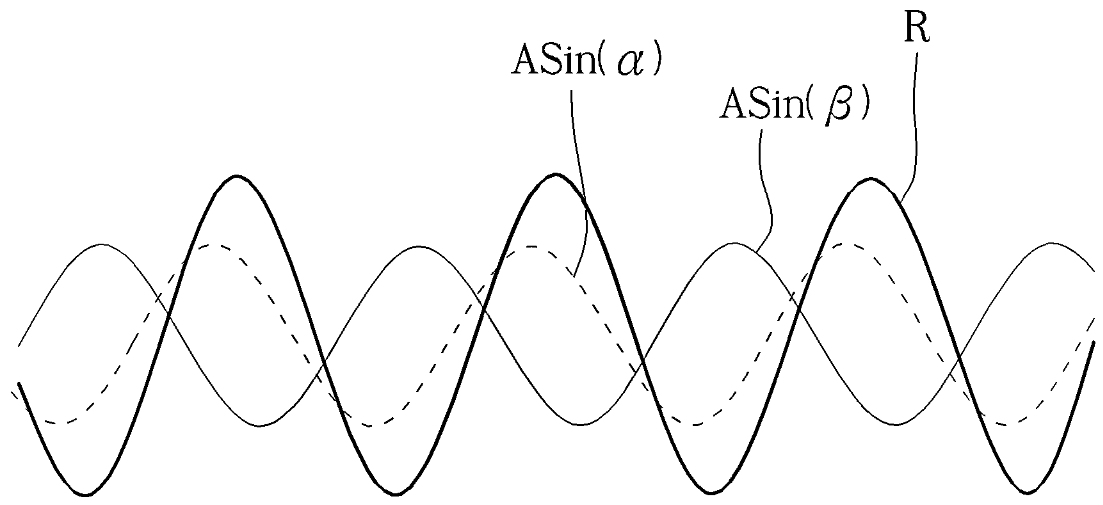
FIG. 6 is a diagram illustrating estimation of flicker signals that cause sliding bandings between two flicker-dependent frames according to an embodiment of the present invention.

Please refer to FIG. 5 and FIG. 6. FIG. 5 is a diagram illustrating estimation of a sinusoidal waveform $D\cdot\sin(\theta)$ that best fits a residual signal according to an embodiment of the present invention. FIG. 6 is a diagram illustrating estimation of flicker signals $A\sin(\alpha)$ and $A\sin(\beta)$ that cause sliding bandings between two flicker-dependent frames F_1 and F_2 according to an embodiment of the present invention. As shown in FIG. 5, the compensation gain estimation circuit 102 derives one characteristic signal S1 from the flicker-dependent frame F_1, and derives another characteristic signal S2 from the flicker-dependent frame F_2. For example, the characteristic signal S1 may be derived from a partial frame 502 selected from the flicker-dependent frame F_1, and the characteristic signal S2 may be derived from a partial frame 504 selected from the flicker-dependent frame F_2, where selection of partial frames 502 and 504 may be made with/without the aid of external segmentation information. The characteristic signal S1 may be obtained by averaging pixel values of pixels on each row of the partial frame 502. The characteristic signal S2 may be obtained by averaging pixel values of pixels on each row of the partial frame 504. A residual signal R may be derived from dividing one of characteristic signals S1 and S2 by the other of characteristic signals S1 and S2, or may be derived from subtracting one of characteristic signals S1 and S2 from the other of characteristic signals S1 and S2. In this embodiment, the residual signal R may be a difference between characteristic signals S1 and S2. After the residual signal R is obtained, the compensation gain estimation circuit 102 estimates parameters (e.g., magnitude D and phase φ) of a sinusoidal waveform $D\cdot\sin(\varphi)$ that best fits the residual signal R (e.g., R=S2−S1), where $$D\cdot\sin(\varphi)=2A\sin\left(\frac{\phi}{2}\right)\cdot\cos\left(\frac{\phi}{2}\right).$$

For example, Fourier transform or other fitting algorithm may be employed by the compensation gain estimation circuit 102. The phase difference φ comes from the setting of camera. In $\phi=2\pi\cdot\text{Frac}(f\cdot\Delta t)$, f is frequency of AC and Δt is the difference between two sliding frames. The frequency information can be provided externally or user-defined. After the magnitude D and phase φ of the sinusoidal waveform $D\cdot\sin(\varphi)$ are successfully estimated for the residual signal R, the compensation gain estimation circuit 102 finds A, α, and β that can satisfy the following formula.

$$A\sin(\beta)-A\sin(\alpha)=A\sin(\alpha+\phi)-A\sin(\alpha)=2A\sin\left(\frac{\phi}{2}\right)\cdot\cos\left(\theta+\frac{\phi}{2}\right)\quad(1)$$

The compensation gain CG_1 for the flicker-dependent frame F_1 can be determined based on the flicker signal $A\sin(\alpha)$. Specifically, the flicker signal $A\sin(\alpha)$ can be used to determine compensation values of the compensation gain CG_1 that are used for flicker compensation of different rows of the flicker-dependent frame F_1. After each of the compensation values is applied to (e.g., added to or multiplied with) pixel values of at least a portion (e.g., part or all) of pixels located on a same row selected from rows of the flicker-dependent frame F_1, a flicker-compensated frame F_1' with no flicker or mitigated flicker can be generated. Similarly, the compensation gain CG_2 for the flicker-dependent frame F_2 can be determined based on the flicker signal $A\sin(\beta)$. Specifically, the flicker signal $A\sin(\beta)$ can be used to determine compensation values of the compensation gain CG_2 that are used for flicker compensation of different rows of the flicker-dependent frame F_2. After each of the compensation values is applied to (e.g., added to or multiplied with) pixel values of at least a portion (e.g., part or all) of pixels located on a same row selected from rows of the flicker-dependent frame F_2, a flicker-compensated frame F_2' with no flicker or mitigated flicker can be generated.

It should be noted that the computation of compensation gains is not limited to the above-mentioned mathematical-model-based approach. In practice, any means capable of determining compensation gains by using two or more flicker-dependent frames with sliding bandings can be employed by the compensation gain estimation circuit 102.

In some embodiments of the present invention, the compensation gain estimation circuit 102 may employ an artificial intelligence (AI) aided approach for compensation gain estimation. For example, the compensation gain estimation circuit 102 may utilize a neural network to estimate the compensation gains CG_1-CG_N, where the neural network may take the flicker-dependent frames F_1-F_N as its inputs.

In some embodiments of the present invention, the compensation gain estimation circuit 102 may derive a plurality of down-scaled frames from the flicker-dependent frames F_1-F_N, respectively, and estimate the compensation gains CG_1-CG_N for the flicker-dependent frames F_1-F_N according to the down-scaled frames. For example, the mathematical-model-based approach may obtain characteristic signals from partial frames selected from down-scaled frames (which are generated from down-scaling the flicker-dependent frames F_1-F_N). For another example, the AI-aided approach may use down-scaled frames (which are generated from down-scaling the flicker-dependent frames F_1-F_N) as inputs of the neural network.

As mentioned above, the flicker removal circuit 104 applies flicker compensation to the flicker-dependent frames F_1-F_N according to the compensation gains CG_1-CG_N, respectively. In a first flicker removal design, the flicker removal circuit 104 may apply flicker compensation to each row included in each of the flicker-dependent frames F_1-F_N. For example, the flicker compensation may be applied to each entire row. For another example, the flicker compensation may be local flicker compensation that is applied to only a portion of each row. In a second flicker removal design, the flicker removal circuit 104 may apply flicker compensation to only a portion of rows included in each of the flicker-dependent frames F_1-F_N. Hence, only some rows n one flicker-dependent frame will undergo flicker compensation. For example, the flicker removal circuit 104 may apply flicker compensation to brighter rows included in bright bandings with one compensation gain setting. For example, the flicker removal circuit 104 may apply flicker compensation to darker rows included in dark bandings with another compensation gain setting. In a third flicker removal design, the flicker removal circuit 104 may utilize a neural network to control flicker compensation applied to each of the flicker-dependent frames F_1-F_N. For example, the number of selected rows in one flicker-dependent frame that require flicker compensation and/or the magnitude of flicker compensation to be applied to one selected row may be determined using artificial intelligence.

Compared to the conventional de-flicker approaches, the proposed de-flicker approach offers the following key improvement. A de-flicker process performed by the de-flicker system 100 has low computation complexity, and can be executed on mobile phones, allowing for portability. There is no requirement for flicker-independent frames (i.e., flicker-free frames) as the reference. Therefore, the de-flicker system 100 can co-work with a camera module operating in a regular single-exposure mode, a DG-HDR mode, or any other HDR mode. Hence, the camera module with no particular shutter time constraint enables an increase in the DG-HDR image's dynamic range, especially in scenes illuminated by bright light, has the ability to capture fast-moving objects requiring shorter shutter time, enhances overall image quality to provide a more appealing visual experience, and/or facilitates high-level image processing tasks like segmentation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A de-flicker system comprising:

a compensation gain estimation circuit, configured to receive a plurality of flicker-dependent frames from a camera module with sliding bandings, and estimate a compensation gain for each of the plurality of flicker-dependent frames according to the plurality of flicker-dependent frames; and a flicker removal circuit, configured to apply flicker compensation to said each of the plurality of flicker-dependent frames according to the compensation gain, wherein the compensation gain estimation circuit derives a plurality of down-scaled frames from the plurality of flicker-dependent frames, respectively, and estimates the compensation gain for said each of the plurality of flicker-dependent frames according to the plurality of down-scaled frames.

2. The de-flicker system of claim 1, wherein the compensation gain estimation circuit utilizes a mathematical model to model the compensation gain, and estimates parameters of the mathematical model according to the plurality of flicker-dependent frames.

3. The de-flicker system of claim 1, wherein the compensation gain estimation circuit utilizes a neural network to estimate the compensation gain.

4. The de-flicker system of claim 1, wherein the flicker removal circuit applies the flicker compensation to each row included in said each of the plurality of flicker-dependent frames.

5. The de-flicker system of claim 1, wherein the flicker removal circuit applies the flicker compensation to only a portion of rows included in said each of the plurality of flicker-dependent frames.

6. The de-flicker system of claim 1, wherein the flicker removal circuit utilizes a neural network to control the flicker compensation applied to said each of the plurality of flicker-dependent frames.

7. The de-flicker system of claim 1, wherein the compensation gain estimation circuit receives the plurality of flicker-dependent frames from the camera module operating under a regular single-exposure mode.

8. The de-flicker system of claim 1, wherein the compensation gain estimation circuit receives the plurality of flicker-dependent frames from the camera module operating under a dual-gain high dynamic range (DG-HDR) mode.

9. The de-flicker system of claim 1, wherein the compensation gain estimation circuit receives the plurality of flicker-dependent frames from the camera module operating under a high dynamic range (HDR) mode with no flicker-independent frame.

10. A de-flicker method comprising:

receiving a plurality of flicker-dependent frames from a camera module with sliding bandings;

estimating a compensation gain for each of the plurality of flicker-dependent frames according to the plurality of flicker-dependent frames; and applying flicker compensation to said each of the plurality of flicker-dependent frames according to the compensation gain, wherein estimating the compensation gain for said each of the plurality of flicker-dependent frames according to the plurality of flicker-dependent frames comprises:

deriving a plurality of down-scaled frames from the plurality of flicker-dependent frames, respectively; and estimating the compensation gain for said each of the plurality of flicker-dependent frames according to the plurality of down-scaled frames.

11. The de-flicker method of claim 10, wherein estimating the compensation gain for said each of the plurality of flicker-dependent frames according to the plurality of flicker-dependent frames comprises:

utilizing a mathematical model to model the compensation gain; and estimating parameters of the mathematical model according to the plurality of flicker-dependent frames.

12. The de-flicker method of claim 10, wherein estimating the compensation gain for said each of the plurality of flicker-dependent frames according to the plurality of flicker-dependent frames comprises:

utilizing a neural network to estimate the compensation gain.

13. The de-flicker method of claim 10, wherein applying the flicker compensation to said each of the plurality of flicker-dependent frames according to the compensation gain comprises:

applying the flicker compensation to each row included in said each of the plurality of flicker-dependent frames.

14. The de-flicker method of claim 10, wherein applying the flicker compensation to said each of the plurality of flicker-dependent frames according to the compensation gain applying the flicker compensation to only a portion of rows included in said each of the plurality of flicker-dependent frames.

15. The de-flicker method of claim 10, wherein applying the flicker compensation to said each of the plurality of flicker-dependent frames according to the compensation gain comprises:

utilizing a neural network to control the flicker compensation applied to said each of the plurality of flicker-dependent frames.

16. The de-flicker method of claim 10, wherein receiving the plurality of flicker-dependent frames with sliding bandings comprises: receiving the plurality of flicker-dependent frames that are output from the camera module operating under a regular single-exposure mode.

17. The de-flicker method of claim 10, wherein receiving the plurality of flicker-dependent frames with sliding bandings comprises:

receiving the plurality of flicker-dependent frames that are output from the camera module operating under a dual-gain high dynamic range (DG-HDR) mode.

18. The de-flicker method of claim 10, wherein receiving the plurality of flicker-dependent frames with sliding bandings comprises:

receiving the plurality of flicker-dependent frames that are output from the camera module operating under a high dynamic range (HDR) mode with no flicker-independent frame.

* * * * *